US010694554B2

(12) United States Patent
Zhu et al.

(10) Patent No.: US 10,694,554 B2
(45) Date of Patent: Jun. 23, 2020

(54) DATA TRANSMISSION METHOD AND HOST MACHINE (71) Applicant: Huawei Technologies Co., Ltd., Shenzhen, Guangdong (CN)

(72) Inventors: Hualin Zhu, Shanghai (CN); Weisheng Jin, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/041,533

(22) Filed: Jul. 20, 2018

(65) Prior Publication Data
US 2018/0352588 A1 Dec. 6, 2018

Related U.S. Application Data (63) Continuation of application No. PCT/CN2016/071949, filed on Jan. 25, 2016.

(51) Int. Cl.
*H04W 4/00* (2018.01)
*H04W 76/10* (2018.01)
*G06F 9/455* (2018.01)
*H04L 12/46* (2006.01)
*H04L 29/08* (2006.01)
*H04L 29/12* (2006.01)
*H04W 88/16* (2009.01)

(52) U.S. Cl.
CPC ........ *H04W 76/10* (2018.02); *G06F 9/45558* (2013.01); *H04L 12/46* (2013.01); *H04L 29/08* (2013.01); *H04L 61/2007* (2013.01); *H04W 88/16* (2013.01); *G06F 2009/45595* (2013.01)

(58) Field of Classification Search
CPC ...... H04W 76/10; H04W 88/16; H04L 29/06; H04L 12/46
See application file for complete search history.

(56) References Cited

U.S. PATENT DOCUMENTS 9,928,107 B1 * 3/2018 Vincent ................ G06F 9/4856
2007/0101323 A1 * 5/2007 Foley .................. G06F 9/45537
718/1

(Continued)

FOREIGN PATENT DOCUMENTS

CN 101459618 A 6/2009
CN 101605084 A 12/2009

(Continued)

*Primary Examiner* — Abdelnabi O Musa
(74) *Attorney, Agent, or Firm* — Kilpatrick Townsend & Stockton LLP (57) ABSTRACT

Embodiments of this application provide a data transmission method and a host machine, so that when a host machine cannot directly connect to the Internet, a virtual terminal can still connect to a mobile network. This extends an application scope of the virtual terminal. The host machine obtains a first network address of a physical terminal, where the physical terminal has started to establish a connection or has established a connection to the mobile network; and the host machine sets a second network address of the virtual terminal to the first network address, so that the virtual terminal sends data to the mobile network by using the first network address and/or receives, by using the first network address, data sent by the mobile network. The virtual terminal runs on the host machine.

14 Claims, 4 Drawing Sheets (56) References Cited

U.S. PATENT DOCUMENTS

| | | |
|---|---|---|
| 2008/0107112 A1 | 5/2008 | Kuo et al. |
| 2010/0014459 A1 | 1/2010 | Mir et al. |
| 2012/0063458 A1 | 3/2012 | Klink et al. |
| 2012/0079113 A1* | 3/2012 | Zhu .................... H04L 63/0272 709/225 |
| 2014/0314089 A1* | 10/2014 | Ke ......................... H04L 45/74 370/392 |
| 2015/0026681 A1 | 1/2015 | Lin et al. |
| 2015/0043581 A1* | 2/2015 | Devireddy ............. H04L 49/70 370/392 |
| 2015/0106913 A1* | 4/2015 | Wang ................. H04L 63/0236 726/13 |
| 2015/0365323 A1 | 12/2015 | Duminuco et al. |

FOREIGN PATENT DOCUMENTS

| | | |
|---|---|---|
| CN | 103346981 A | 10/2013 |
| CN | 103812704 A | 5/2014 |

\* cited by examiner

DATA TRANSMISSION METHOD AND HOST MACHINE

CROSS-REFERENCE TO RELATED APPLICATIONS

This application is a continuation of International Patent Application No. PCT/CN2016/071949, filed on Jan. 25, 2016. The disclosure of the aforementioned application is hereby incorporated by reference in the entity.

TECHNICAL FIELD

Embodiments of this application relate to the communications field, and in particular, to a data transmission method and a host machine.

BACKGROUND

With rapid development of a current communications industry, cloud computing technologies are increasingly prevalent in the communications industry. A virtual terminal is one of application forms of cloud computing in the communications industry, and the virtual terminal can replace a physical terminal to perform most computing processing tasks, so as to simplify a design of the physical terminals, and significantly reduce costs of the physical terminals Because a network address of a virtual terminal is allocated by a host machine, when a data packet sent by the virtual terminal passes through a packet data network gateway (P-GW), a network address of the data packet cannot be identified by the P-GW, and the P-GW does not receive or process the data packet. Therefore, a virtual terminal cannot connect to the Internet in a common manner of a physical terminal that uses a mobile network, but needs to directly connect to the Internet by using a host machine.

However, in a communications network, not all host machines have a function of directly connecting to the Internet, and when a host machine cannot connect to the Internet, the virtual terminal loses a function of exchanging data with the Internet. Consequently, an application scope of the virtual terminal is limited.

SUMMARY

Embodiments of this application provide a data transmission method and a host machine, so that when a host machine cannot directly connect to the Internet, a virtual terminal can still perform data transmission with the Internet by using a mobile network. This extends an application scope of the virtual terminal.

According to a first aspect, an embodiment of this application provides a data transmission method, including:

obtaining, by a host machine, a first network address of a physical terminal, where the physical terminal has started to establish a connection or has established a connection to a mobile network, a virtual terminal runs on the host machine, the host machine and the virtual terminal are located in a same data center, and the first network address may be used to identify a source address from which the physical terminal sends data. The first network address may be represented in different forms, and this is not limited herein.

After obtaining the first network address of the physical terminal, the host machine may set a second network address of the virtual terminal to the first network address. In this way, the virtual terminal can send data to the mobile network by using the second network address and/or receive, by using the second network address, data sent by the mobile network, that is, the virtual terminal uses the network address of the physical terminal to perform communication.

In the solution provided in this embodiment of this application, when the host machine cannot directly connect to the Internet, the virtual terminal can still perform data transmission by using the mobile network, that is, select, as a host machine, a communications network element that cannot directly connect to the Internet in a communications network. This extends an application scope of the virtual terminal.

Optionally, obtaining first network address of the physical terminal by the host machine includes the following possible implementations.

A possible implementation is: When the physical terminal has established a connection to the mobile network, the host machine receives a data packet sent by the physical terminal, and the host machine parses the data packet to obtain the first network address of the physical terminal.

In the solution provided in this embodiment of this application, the host machine can directly obtain the first network address by reading information about the data packet of the physical terminal, without using an additional device or module. This reduces device costs.

Another possible implementation is: A network address storage module is added to a mobile network system, where the network address storage module is configured to store a network address of the physical terminal, and it is ensured that the network address storage module is connected to the host machine. When the physical terminal has started to establish a connection or has established a connection the mobile network, the host machine may obtain the first network address of the physical terminal from the network address storage module. In the solution provided in this embodiment of this application, the host machine obtains the first network address of the physical terminal from the network address storage module. The first network address of the physical terminal may be obtained in a process in which the physical terminal establishes a connection, or may be obtained after the physical terminal establishes a connection. This enables the host machine to more quickly obtain the first network address by the host machine.

Optionally, before the virtual terminal sends data to the mobile network according to the first network address, the host machine needs to determine that a port number of the physical terminal is not in conflict with a port number of the virtual terminal. To resolve this problem, this embodiment of this application provides the following implementations.

A possible implementation is: When the host machine determines that a first port number of the physical terminal is in conflict with a second port number of the virtual terminal, the host machine sets the first port number to a third port number, and sets the second port number to a fourth port number. The first port number is obtained by parsing the data packet sent by the host machine, the third port number is a port number obtained after configuration for the physical terminal, the fourth port number is a port number obtained after configuration for the virtual terminal, and the third port number is not in conflict with the fourth port number. In the solution provided in this embodiment of this application, a port is reset only when a first port is in conflict with a second port. This eliminates a step of presetting a port, and reduces burden of the host machine.

When the host machine resets the port number of the physical terminal and the port number of the virtual terminal, the first port number of the physical terminal may remain unchanged, and only the second port number of the virtual terminal is changed, that is, the third port number is the first port number, and the fourth port number is a port number that is not in conflict with the first port number; or the second port number of the virtual terminal may remain unchanged, and only the first port number of the physical terminal is changed, that is, the fourth port number is the second port number, and the third port number is a port number that is not in conflict with the second port number. A specific method is not limited, provided that the physical terminal and the virtual terminal can properly send data.

In addition, based on this possible implementation, the virtual terminal sends the data to the mobile network by using the first network address and the fourth port number and/or receives, by using the first network address and the fourth port number, the data sent by the mobile network. The solution provided in this embodiment of this application allows for quicker identification of a sender during receiving of downlink data.

Optionally, based on this possible implementation, the host machine records a first mapping relationship and a second mapping relationship, where the first mapping relationship is used to indicate that the second network address is set to the first network address, and the second mapping relationship is used to indicate that the first port number is configured to the third port number, and the second port number is configured to the fourth port number. After the host machine receives a first downlink data packet sent by the mobile network, the host machine parses the first downlink data packet to obtain the third port number and/or the fourth port number, and the first network address. When the host machine determines, according to the second mapping relationship, that the fourth port number is the second port number, the host machine translates the first network address into the second network address according to the first mapping relationship, to obtain a first target downlink data packet, and the host machine sends the first target downlink data packet to the virtual terminal. When the host machine determines, according to the second mapping relationship, that the third port number is the first port number, the host machine sends the first downlink data packet to the physical terminal. In the solution provided in this embodiment of this application, the host machine records a mapping relationship in a conversion process. This helps accurately send data to a target terminal and accelerate data processing.

Another possible implementation is: The host machine determines a fifth port number of the physical terminal from a first preset port number value range, and determines a sixth port number of the virtual terminal from a second preset port number value range, where the first value range and the second value range are not overlapped. That is, it is ensured that the port number of the physical terminal is not in conflict with the port number of the virtual terminal. In the solution provided in this embodiment of this application, before obtaining the first network address of the physical terminal, the host machine presets the port number of the physical terminal and the port number of the virtual terminal, and determines that the port number of the terminal is not in conflict with the port number of the virtual terminal. This can accelerate data transmission.

In addition, based on this possible implementation, the virtual terminal sends data to the mobile network by using the first network address and the sixth port number. The solution provided in this embodiment of this application allows for quicker identification of a sender during receiving of downlink data.

Optionally, based on this possible implementation, the host machine needs to record the first mapping relationship. After receiving a second downlink data packet sent by the mobile network, the host machine parses the second downlink data packet to obtain the fifth port number and/or the sixth port number, and the first network address. When the host machine determines that the sixth port number is obtained, the host machine translates the first network address into the second network address according to the first mapping relationship, to obtain a second target downlink data packet, and the host machine sends the second target downlink data packet to the virtual terminal. When the host machine determines that the fifth port number is obtained, the host machine sends the second downlink data packet to the physical terminal. In the solution provided in this embodiment of this application, the host machine records a mapping relationship in a conversion process. This helps accurately send data to a target terminal and accelerate data processing.

According to a second aspect, an embodiment of this application provides a host machine, where the host machine has functions of the host machine in the foregoing method. The functions may be implemented by using hardware, or may be implemented by executing corresponding software by hardware. The hardware or software includes one or more modules corresponding to the foregoing functions.

In a possible implementation, the host machine includes:
a receiving module, configured to obtain a first network address of a physical terminal, where the physical terminal has started to establish a connection or has established a connection to a mobile network; and
a processing module, configured to set a second network address of a virtual terminal to the first network address obtained by the receiving module, so that the virtual terminal sends data to the mobile network by using the first network address, where the virtual terminal runs on the host machine, and the host machine and the virtual terminal are located in a same data center.

In another possible implementation, the host machine includes:
a network interface and a processor, where
the network interface is configured to obtain a first network address of a physical terminal; and
the processor is configured to set a second network address of a virtual terminal to the first network address obtained by the receiving module, so that the virtual terminal sends data to the mobile network by using the first network address.

According to a third aspect, an embodiment of this application provides a computer storage medium, where the computer storage medium stores program code, and the program code is used for instructing to perform the method of the foregoing first aspect.

The embodiments of this application have the following advantages:

The physical terminal establishes a normal connection to the mobile network, the host machine on which the virtual terminal is located obtains the first network address of the physical terminal, and changes the second network address of the virtual terminal according to the first network address of the physical terminal, so that the second network address is the same as the first network address, and the virtual terminal performs data transmission with the mobile network by using a changed second network address. Because the first network address of the physical terminal is allocated by a P-GW, the data packet sent by the physical terminal carries the first network address, and the P-GW receives the data packet. Likewise, when the host machine cannot directly connect to the Internet, and the virtual terminal sends a data packet by using the first network address, the P-GW can also receive and process the data packet sent by the virtual terminal, that is, the virtual terminal may exchange data with the Internet by using the mobile network. That is, in a communications network, a communications network element that cannot directly connect to the Internet may be selected as a host machine. This extends an application scope of the virtual terminal.

DESCRIPTION OF EMBODIMENTS

In the specification, claims, and accompanying drawings of this application, the terms "first", "second", "third", "fourth", and so on (if any) are intended to distinguish between similar objects but do not necessarily indicate a specific order or sequence. It should be understood that the data termed in such a way are interchangeable in proper circumstances so that the embodiments of the present disclosure described herein can be implemented in other orders than the order illustrated or described herein. In addition, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

Figure 1:
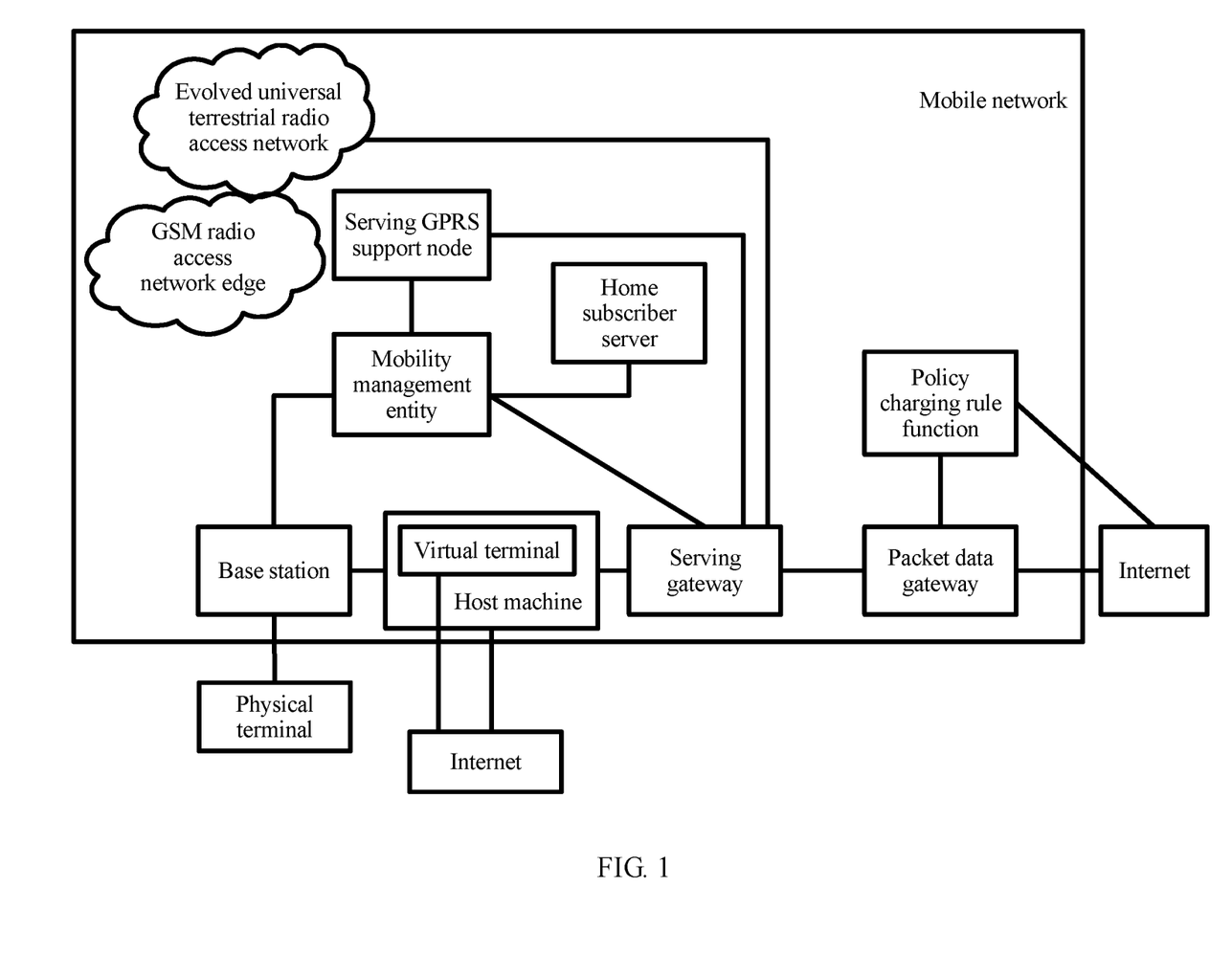
FIG. 1 is a schematic diagram of a framework of a data transmission system according to an embodiment of this application.

Referring to a diagram of an architecture of a Long Term Evolution (LTE) network shown in FIG. 1, the LTE network mainly includes three logical functional entities: a mobility management entity (MME), a serving gateway (S-GW), and a packet data network gateway (P-GW). The MME is a mobility management network element, and is responsible for exchanging non-access signaling (NAS) signaling between the MME and user equipment and encrypting the NAS signaling, allocating a temporary identifier for the user equipment, selecting core network elements such as an S-GW and a P-GW/GGSN, and providing functions such as roaming, tracing, and security. The MME is corresponding to a control plane part of a serving GPRS support node (SGSN) in a current Universal Mobile Telecommunications System (UMTS) system. The S-GW is a mobility anchor for a handover between local evolved NodeBs (eNodeB), and provides a function related to lawful interception. The P-GW is responsible for user address allocation, policy control, execution of a charging rule, and a function related to lawful interception. A home subscriber server (HSS) is configured to store user subscription information. A policy charging rule function (PCRF) provides a policy and charging control rule. A physical terminal establishes a normal connection to a mobile network by using a base station. A virtual terminal runs on a communications network element (a host machine) having a computation function in a mobile communications network, and implements a data processing function through software simulation. The host machine may be a communications network element having a computation function in the mobile communications network, such as an MME, an S-GW, a P-GW, or a Mobile Edge Computing (MEC). That the host machine is an MEC is used an example herein.

The virtual terminal does not have capabilities of sending and receiving radio signals, and therefore cannot connect to the mobile network in a common manner of the physical terminal, and need to directly connect to the Internet by using the host machine. However, in the communications network, not all host machines have a function of directly connecting to the Internet, and consequently, an application range of the virtual terminal is limited.

To resolve the problem, an embodiment of this application provides the following technical method: A host machine obtains a first network address of a physical terminal, where the physical terminal has started to establish a connection or has established a connection to a mobile network; and the host machine sets a second network address of a virtual terminal to the first network address, so that the virtual terminal sends data to the mobile network by using the first network address and/or receives, by using the first network address, data sent by the mobile network, where the virtual terminal runs on the host machine.

Although an LTE system is used as an example for description in the foregoing background part, a person skilled in the art should know that the present disclosure is not only applicable to the LTE system, but also applicable to other wireless communications systems, such as a Global System for Mobile Communications (GSM), a Universal Mobile Telecommunications System (UMTS), a Code Division Multiple Access (CDMA) system, and a new network system. The following describes specific embodiments by using the LTE system as an example.

In this application, implementation of data transmission by the virtual terminal by using the first network address includes two possible implementations. Details are separately shown in FIG. 2 and FIG. 3.

1. The virtual terminal receives, by using the first network address, the data sent by the mobile network.

Figure 2:
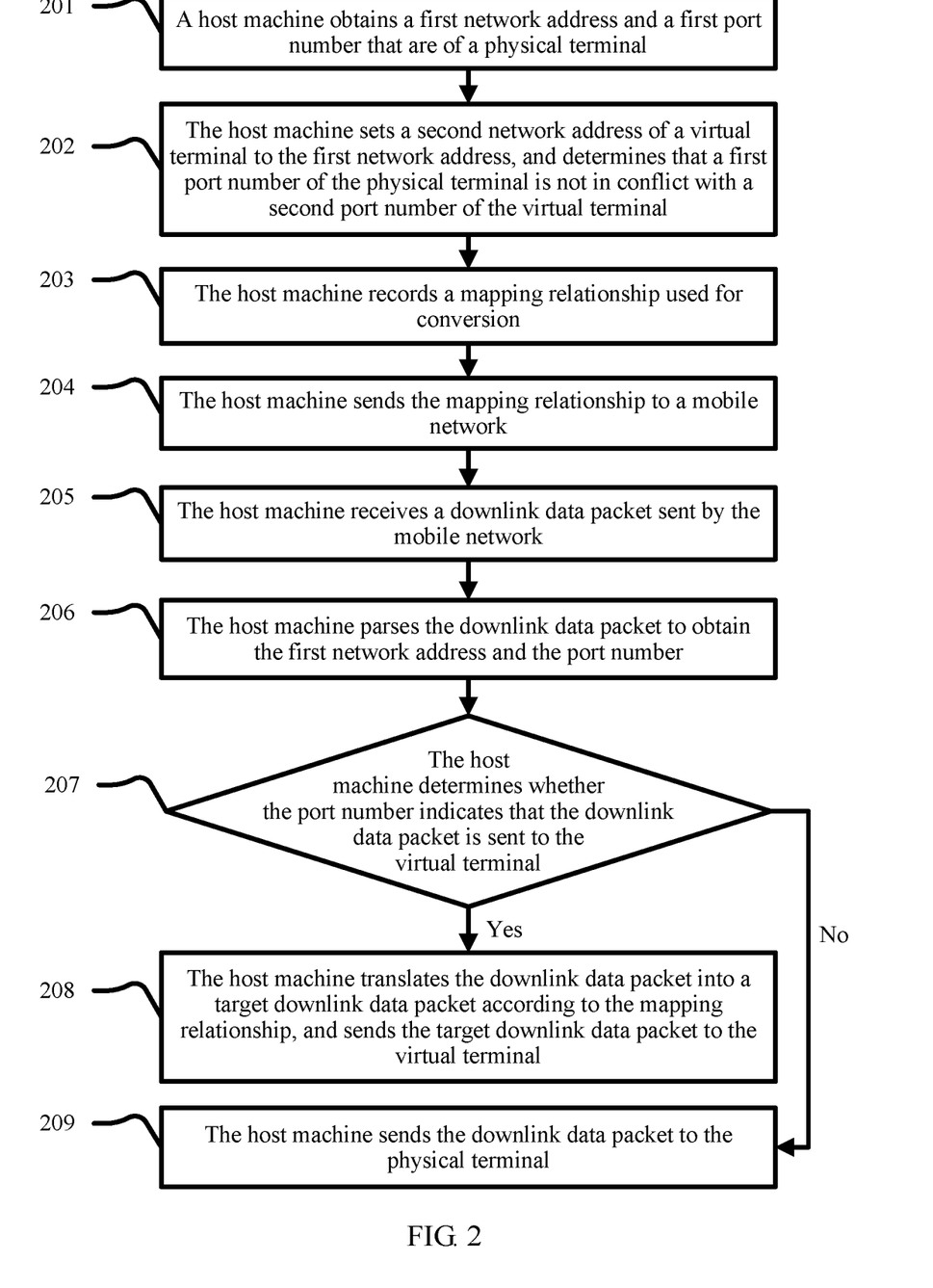
FIG. 2 is a schematic diagram of an embodiment of a data transmission method according to an embodiment of this application.

For a specific case, refer to FIG. 2.

201. The host machine obtains the first network address and a first port number that are of the physical terminal.

After the physical terminal establishes a normal connection to the mobile network, the physical terminal sends a data packet to the mobile network. The data packet passes through the host machine, and the host machine receives the data packet.

The host machine parses the received data packet to obtain a first IP address and the first port number that are of the physical terminal. For example, the first IP address of the physical terminal is 10.0.0.100, and the port number is 500.

The host machine may further obtain the first IP address of the physical terminal by using the following method: adding one network address storage module to the mobile network system, where the host machine is connected to the network address storage module, and the network address storage module stores the first IP address of the physical terminal. Therefore, the host machine can obtain the first IP address of the physical terminal from the network address storage module. After the physical terminal establishes a connection to the mobile network, the host machine may parse the data packet sent by the physical terminal, to obtain the first port number. In actual application, the host machine may obtain the first network address and the first port number that are of the physical terminal by using a plurality of methods, and a specific method is not limited herein.

The network address storage module may store a plurality of network addresses of the physical terminals, or may store only a required network address of the physical terminal. A quantity of network addresses stored in the network address storage module is not limited herein.

It should be noted that, the first network address may be an IP address, or may be an address represented in another form. This is not limited herein, provided that a source of an address of the physical terminal is correctly indicated.

202. The host machine sets a second network address of the virtual terminal to the first network address, and determines that the first port number of the physical terminal is not in conflict with the second port number of the virtual terminal.

The host machine sets, to the first IP address, a second IP address of a virtual terminal that is located in a same data center as the host machine, where the virtual terminal runs on the host machine. In addition, the host machine needs to ensure that the port number of the physical terminal is not in conflict with the port number of the virtual terminal.

A specific manner is shown in Table 1

TABLE 1

|  | Before change | After change |
| --- | --- | --- |
| UE Source IP/Source Port | 10.0.0.100/500 | 10.0.0.100/1000 |
| VT 1 Source IP/Source Port | 192.168.1.100/500 | 10.0.0.100/1001 |
| VT 2 Source IP/Source Port | 192.168.1.101/400 | 10.0.0.100/1002 |

As shown in FIG. 1, UE is the physical terminal, VT 1 is a virtual terminal 1, and VT 2 is a virtual terminal 2.

UE Source IP is the first IP address, UE Source Port before change is the first port number, and UE Source Port after change is a third port number.

VT 1 Source IP and VT 2 Source IP are second IP addresses, VT 1 Source Port and VT 2 Source Port before change are second port numbers, and VT 1 Source Port and VT 2 Source Port after change are fourth port numbers.

The port number of the physical terminal is 500, a port number of the virtual terminal 1 is 500, and a port number of the virtual terminal 2 is 400. In this case, the port number of the physical terminal is in conflict with the port number of the virtual terminal 1. In Table 1, the host machine resets the port number of the physical terminal, the port number of the virtual terminal 1, and the port number of the virtual terminal 2. However, in actual application, the host machine may only reset the port number of the physical terminal from 500 to 600, or only reset the port number of the virtual terminal 1 from 500 to 700. Herein, the host machine only needs to reset the port numbers to port numbers that are not in conflict, and a specific method is not limited herein.

Optionally, a case in which the host machine changes the second IP address of the virtual terminal to ensure that the port numbers are not in conflict may be shown in the following Table 2 and Table 3.

TABLE 2

|  | Port configuration range |
| --- | --- |
| UE Source Port | 1-1000 |
| VT 1 Source Port | 1001-2000 |
| VT 2 Source Port | 2001-3000 |
| Another virtual terminal | Another port number |

TABLE 3

|  | Before change | After change |
| --- | --- | --- |
| UE 1 Source IP/Source Port | 10.0.0.100/400 | 10.0.0.100/400 |
| VT 1 Source IP/Source Port | 192.168.1.100/1001 | 10.0.0.100/1001 |
| UE 2 Source IP/Source Port | 10.0.0.101/600 | 10.0.0.101/600 |
| VT 2 Source IP/Source Port | 192.168.1.101/2001 | 10.0.0.101/2001 |

As shown in Table 2, UE Source Port is a port number value range preset by the host machine for the physical terminal, and VT 1 Source Port and the VT 2 Source Port are port number value ranges preset by the host machine for the virtual terminal, and it is ensured that these value ranges are not overlapped, that is, not in conflict. In this way, it can be ensured that no port conflict occurs between the physical terminal and the virtual terminal.

As shown in Table 3, different virtual terminals running on a same host machine can send data to the mobile network by using different network addresses of the physical terminal. A specific method is not limited herein, provided that the virtual terminals connect to the mobile network.

In actual application of this embodiment of this application, a manner in which the host machine ensures that the port numbers are not in conflict shown in Table 1 and a manner in which the host machine ensures that the port numbers are not in conflict shown in Table 2 and Table 3 may be independently used, or may be combined for use. A specific use manner is not limited herein.

It should be noted that, if the first port number of the physical terminal is not in conflict with the second port number of the virtual terminal, the host machine only needs to set the second network address of the virtual terminal to the first network address, without a need to adjust the first port number and the second port number.

203. The host machine records a mapping relationship used for conversion.

When the host machine changes an IP address and a port number in the manner in Table 1, the host machine needs to record and store Table 1.

When the host machine changes an IP address and a port number in the manner in Table 2 and Table 3, the host machine needs to record and store Table 2 and Table 3.

When the host machine changes an IP address and a port number in both the manner in Table 1 and the manner in Table 2 and Table 3, the host machine needs to record and store Table 1, Table 2, and Table 3.

204. The host machine sends the mapping relationship to the mobile network.

The host machine generates a data packet by using the recorded Table 1 and/or Table 2 and Table 3, and sends the data packet to the mobile network, and the mobile network parses the data packet to obtain and store Table 1 and/or Table 2 and Table 3.

205. The host machine receives a downlink data packet sent by the mobile network.

After learning Table 1 and/or Table 2 and Table 3, when the mobile network sends a downlink data packet to the physical terminal, the downlink data packet carries 10.0.0.100/1000 in Table 1 and/or 10.0.0.100/400 or 10.0.0.100/600 in Table 3; or when the mobile network sends the downlink data packet to the virtual terminal, the downlink data packet carries 10.0.0.100/1001 or 10.0.0.100/1002 in Table 1 and/or 10.0.0.100/1001 or 10.0.0.101/2001 in Table 3. The downlink data packet passes through the host machine, and the host machine receives the downlink data packet.

206. The host machine parses the downlink data packet to obtain the first network address and the port number.

After receiving the downlink data packet, the host machine parses the downlink data packet to obtain the first IP address 10.0.0.100 and a target port number that are carried in the downlink data packet. The target port number may be 1000, 1001 or 1002 in Table 1, or may be 400, 600, 1001 or 2001 in Table 3.

207. The host machine determines whether the target port number indicates that the downlink data packet is sent to the virtual terminal; and if the target port number indicates that the downlink data packet is sent to the virtual terminal, step 208 is performed, or if the target port number does not indicate that the downlink data packet is sent to the virtual terminal, step 209 is performed.

After the host machine obtains the target port number, the host machine determines a terminal to which the target port number belongs.

For example, referring to Table 1, when the target port number is 1000, the host machine determines, according to a second mapping relationship, that the target port number belongs to the physical terminal; or when the target port number is 1001, the host machine determines, according to the second mapping relationship, that the target port number belongs to the virtual terminal 1.

For example, referring to Table 2 and Table 3, when the target port number is 400, the host machine determines that the target port number belongs to a physical terminal 1; when the target port number is 1001, the host machine determines that the target port number belongs to the virtual terminal 1; or when the target port number is 2001, the host machine determines that the target port number belongs to the virtual terminal 2.

208. The host machine translates the downlink data packet into a target downlink data packet according to the mapping relationship, and sends the target downlink data packet to the virtual terminal.

When the host machine determines that the target port number belongs to the virtual terminal, the host machine changes, according to a first mapping relationship, the first network address carried in the downlink data packet to the second network address, and changes the target port number to an original second port number to obtain a new target downlink data packet, and sends the target data packet to the virtual terminal. For a specific manner, refer to Table 4.

As shown in Table 4, the first network address carried in the downlink data packet is 10.0.0.100, the target port number is 1001, and the second network address 192.168.1.100 and the second port number 500 that are of the virtual terminal are returned to the virtual terminal after the first network address and the target port number are translated according to the first mapping relationship and the second mapping relationship.

TABLE 4

|  | Before change | After change |
| --- | --- | --- |
| UE Source IP/Source Port | 10.0.0.100/1000 | 10.0.0.100/500 |
| VT 1 Source IP/Source Port | 10.0.0.100/1001 | 192.168.1.100/500 |
| VT 2 Source IP/Source Port | 10.0.0.100/1002 | 192.168.1.101/400 |

Optionally, when the host machine avoids a conflict between the port numbers by using a method of presetting port numbers, a specific conversion manner is shown in Table 5.

TABLE 5

|  | Before change | After change |
| --- | --- | --- |
| UE 1 Source IP/Source Port | 10.0.0.100/400 | 10.0.0.100/400 |
| VT 1 Source IP/Source Port | 10.0.0.100/1001 | 192.168.1.100/1001 |
| UE 2 Source IP/Source Port | 10.0.0.101/600 | 10.0.0.101/600 |
| VT 2 Source IP/Source Port | 10.0.0.101/2001 | 192.168.1.101/2001 |

As shown in Table 5, in this case, the host machine can generate the target downlink data packet by only translating the network address of the virtual terminal.

209. The host machine sends the downlink data packet to the physical terminal.

If the first port number of the physical terminal has been translated, the host machine translates the target port number into an original first port number according to the second mapping relationship, to generate a new downlink data packet, and a port number carried in the downlink data packet is the original first port number. A specific manner is the same as a conversion manner for the physical terminal in Table 4.

If the first port number of the physical terminal has not been translated, the host machine directly sends the downlink data packet to the physical terminal. A specific manner is the same as a conversion manner for the physical terminal in Table 5.

In this embodiment, the host machine obtains the first network address and the port number of the physical terminal from the data packet sent by the physical terminal or from the network address storage module. The host machine changes the second network address of the virtual terminal according to the first network address of the physical terminal, so that the second network address is the same as the first network address. In addition, the host machine ensures, in a plurality of manners, that the port number of the physical terminal is not in conflict with the port number of the virtual terminal, thereby ensuring a smooth data transmission process. The virtual terminal then performs data transmission with the mobile network by using a changed second network address and a changed port number, so that when the host computer cannot directly connect to the Internet, the virtual terminal can still perform data transmission with the mobile network, that is, a communications network element that cannot directly connect to the Internet in the communications network may be selected as a host machine. This extends an application scope of the virtual terminal.

2. The virtual terminal sends, by using the first network address, the data to the mobile network.

Figure 3:
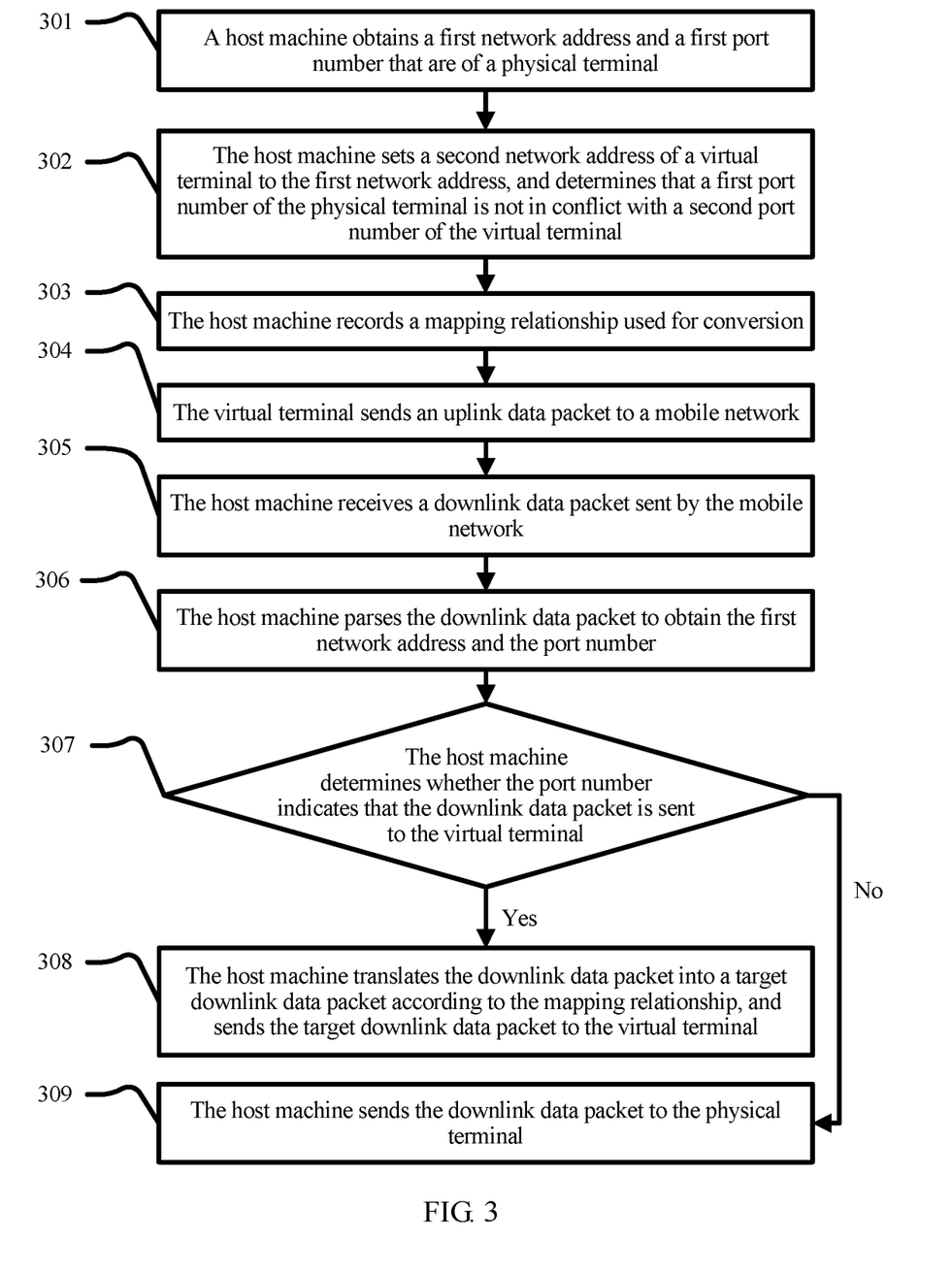
FIG. 3 is a schematic diagram of another embodiment of a data transmission method according to an embodiment of this application.

For a specific case, refer to FIG. 3.

Step 301 to step 303 are the same as step 201 to step 203 in the foregoing embodiment shown in FIG. 2, and details are not described herein again.

304. The virtual terminal sends, by using the first network address, an uplink data packet to the mobile network.

After the host machine changes the second IP address of the virtual terminal to the first IP address, the virtual terminal may send, to the mobile network, an uplink data packet that carries the first IP address.

It should be noted that there is no time sequence between step 304 and step 303. The host machine may first record the mapping relationship, and then the virtual terminal sends the data; or the virtual terminal may first send the data, and then the host machine records the mapping relationship. This is not specifically limited herein.

Step 305 to step 309 are the same as step 205 to step 209 shown in FIG. 2, and details are not described herein again.

In this embodiment, the host machine obtains the first network address and the port number of the physical terminal from the data packet of the physical terminal and from the network address storage module. The host machine changes the second network address of the virtual terminal according to the first network address of the physical terminal, so that the second network address is the same as the first network address. In addition, the host machine ensures, in a plurality of manners, that the port number of the physical terminal is not in conflict with the port number of the virtual terminal, thereby ensuring a smooth data transmission process. The virtual terminal then performs data transmission with the mobile network by using a changed second network address and a changed port number, so that when the host computer cannot directly connect to the Internet, the virtual terminal can still perform data transmission with the mobile network, that is, a communications network element that cannot directly connect to the Internet in the communications network may be selected as a host machine. This extends an application scope of the virtual terminal.

Figure 4:
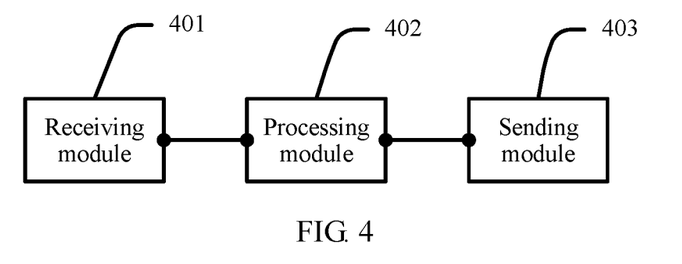
FIG. 4 is a schematic diagram of an embodiment of a host machine according to an embodiment of this application.

Referring to FIG. 4, FIG. 4 shows an embodiment of a host machine according to an embodiment of this application. Specifically, the host machine includes: a receiving module 401, a processing module 402, and a sending module 403.

The receiving module 401 is configured to obtain a first network address of a physical terminal, where the physical terminal has started to establish a connection or has established a connection to a mobile network.

The processing module 402 is configured to set a second network address of a virtual terminal to the first network address obtained by the receiving module, so that the virtual terminal sends data to the mobile network by using the first network address, where the virtual terminal runs on the host machine, and the host machine and the virtual terminal are located in a same data center.

Optionally, the receiving module 401 is further specifically configured to: receive a data packet sent by the physical terminal, where the physical terminal has established a connection to the mobile network; and parse the data packet to obtain the first network address of the physical terminal.

Optionally, the receiving module 401 is further specifically configured to obtain the first network address of the physical terminal from a network address storage module.

Optionally, the processing module 402 is further configured to: when it is determined that a first port number of the physical terminal is in conflict with a second port number of the virtual terminal, configure the first port number to a third port number, and configure the second port number to a fourth port number, where the first port number is obtained by the host machine by parsing the data packet sent by the physical terminal, the third port number is a port number obtained after configuration for the physical terminal, the fourth port number is a port number obtained after configuration for the virtual terminal, and the third port number is not in conflict with the fourth port number, so that the virtual terminal sends data to the mobile network by using the first network address and the fourth port number.

Optionally, the processing module 402 is further configured to record a first mapping relationship and a second mapping relationship, where the first mapping relationship is used to indicate that the second network address is set to the first network address, and the second mapping relationship is used to indicate that the first port number is configured to the third port number and the second port number is configured to the fourth port number.

The receiving module 401 is configured to receive a first downlink data packet sent by the mobile network.

After the receiving module 401 receives the first downlink data packet, the processing module 402 is further configured to: parse the first downlink data packet receiving by the receiving module 401, to obtain the third port number and/or the fourth port number, and the first network address; and when the host machine determines, according to the second mapping relationship, that the fourth port number is the second port number, translate the first network address into the second network address according to the first mapping relationship, to obtain a first target downlink data packet.

The host machine further includes a sending module 403, configured to send, to the virtual terminal, the first target downlink data packet generated by the processing module 402; and when the host machine determines, according to the second mapping relationship, that the third port number is the first port number, send, to the physical terminal, the first downlink data packet received by the receiving module 401.

Optionally, the processing module 402 is further configured to: determine a fifth port number of the physical terminal from a first preset value range, and determine a sixth port number of the virtual terminal from a second preset value range, where the first value range and the second value range are not overlapped, so that the virtual terminal sends data to the mobile network by using the first network address and the sixth port number.

The receiving module 401 is further configured to receive a second downlink data packet sent by the mobile network.

After the receiving module 401 receives the second downlink data packet, the processing module 402 is further configured to parse the second downlink data packet received by the receiving module 401, to obtain the fifth port number and/or the sixth port number, and the first network address; and when the host machine determines that the sixth port number is obtained, translate the first network address into the second network address according to the first mapping relationship, to obtain a second target downlink data packet.

The sending module 403 is further configured to: send, to the virtual terminal, the second target downlink data packet generated by the processing module 402; and when the host machine determines that the fifth port number is obtained, send, to the physical terminal, the second downlink data packet received by the receiving module 401.

In this embodiment, the receiving module 401 may obtain the first network address and the first port number of the physical terminal in different manners, and then the processing module 402 changes the second network address and the second port number that are of the virtual terminal according to the first network address and the first port number that are obtained by the receiving module 401, that is, changes the second network address to the first network address while ensuring that the port number of the physical terminal is not in conflict with the port number of the virtual terminal. The virtual terminal performs data transmission with the mobile network according to the first network address and a port that is not in conflict with the port number of the physical terminal. In this way, when the host machine cannot directly connect to the network, the virtual terminal can still connect to the mobile network. This extends an application scope of the virtual terminal.

Figure 5:
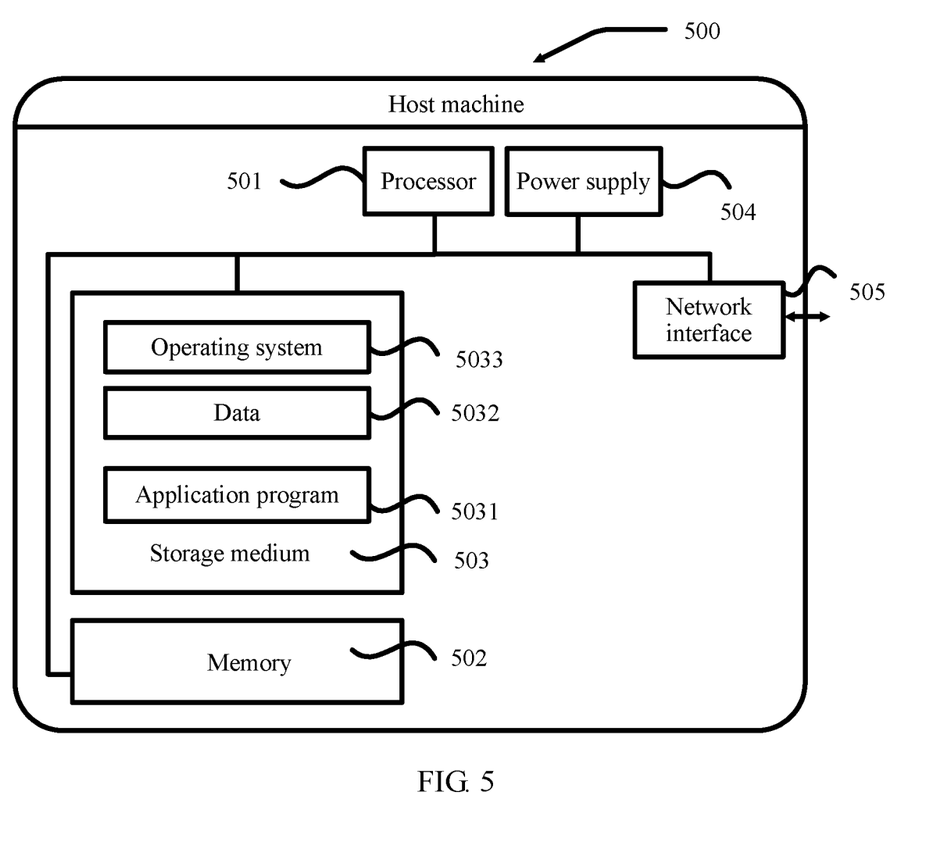
FIG. 5 is a schematic diagram of another embodiment of a host machine according to an embodiment of this application.

Specifically, referring to FIG. 5, FIG. 5 shows another embodiment of a host machine according to an embodiment of this application. Specifically, great differences in the host machine 500 may be generated because of different configurations or performance, and the host machine 500 may include one or more central processing units (CPU) 501 (for example, one or more processors), one or more memories 502, and one or more storage media 503 (for example, one or more mass storage devices) for storing an application program 5031 or data 5032. The memory 502 and the storage medium 503 may be a transient storage or a persistent storage. A program stored in the storage medium 503 may include one or more of the foregoing modules (not shown in the figure), and each module may include a series of instruction operations for a server. Furthermore, the processor 501 may be configured to: communicate with the storage medium 503; and perform, on the host machine 500, a series of instruction operations in the storage medium 503.

The host machine 500 may further include one or more power supplies 504 and one or more network interfaces 505, where the network interface may include a wired or wireless network interface or an input/output interface, and/or one or more operating systems 5033, such as Windows Server™, Mac OS X™, Unix™, Linux™, and FreeBSD™.

The steps performed by the host machine in the foregoing embodiments may be based on a host machine structure shown in FIG. 5.

Details are as follows.

The network interface 505 has the following function: obtaining a first network address of a physical terminal.

The processor 501 has the following function: setting a second network address of a virtual terminal to the first network address, so that the virtual terminal sends data to a mobile network by using the first network address and/or receives, by using the first network address, data sent by the mobile network.

Optionally, the network interface 505 further specifically has the following function: receiving a data packet from the physical terminal.

The processor 501 further specifically has the following function: parsing the data packet to obtain the first network address; or directly obtaining the first network address of the physical terminal from a network address storage module.

Optionally, the processor 501 further has the following functions: when it is determined that a first port number of the physical terminal is in conflict with a second port number of the virtual terminal, configuring the first port number to a third port number, and configuring the second port number to a fourth port number, where the first port number is obtained by the host machine by parsing the data packet sent by the physical terminal, the third port number is a port number obtained after configuration for the physical terminal, the fourth port number is a port number obtained after configuration for the virtual terminal, and the third port number is not in conflict with the fourth port number, so that the virtual terminal sends data to the mobile network by using the network interface 505, the first network address, and the fourth port number.

Optionally, based on the foregoing method, the processor 501 further specifically has the following function: recording a first mapping relationship and a second mapping relationship, where the first mapping relationship is used to indicate that the second network address is set to the first network address, and the second mapping relationship is used to indicate that the first port number is configured to the third port number and the second port number is configured to the fourth port number.

The network interface 505 further specifically has the following function: receiving a first downlink data packet sent by the mobile network.

The processor 501 further specifically has the following functions: parsing received first downlink data packet to obtain the third port number and/or the fourth port number, and the first network address; determining, according to the second mapping relationship, that the fourth port number is the second port number; and translating the first network address into the second network address according to the first mapping relationship, to obtain a first target downlink data packet.

The network interface 505 further specifically has the following function: sending the first target downlink data packet to the virtual terminal.

The processor 501 further specifically has the following function: determining, according to the second mapping relationship, that the third port number is the first port number.

The network interface 505 further specifically has the following function: sending the received first downlink data packet to the physical terminal.

Optionally, the memory 502 has the following function: storing the first mapping relationship and the second mapping relationship.

Optionally, the processor 501 further has the following functions: determining a fifth port number of the physical terminal from a first preset value range, and determining a sixth port number of the virtual terminal from a second preset value range, where the first value range and the second value range are not overlapped, so that the virtual terminal sends data to the mobile network by using the network interface 505, the first network address, and the sixth port number.

Optionally, based on the foregoing method, the network interface 505 further has the following function: receiving a second downlink data packet sent by the mobile network.

The processor 501 further has the following functions: parsing the second downlink data packet received by the receiving module, to obtain the fifth port number and/or the sixth port number, and the first network address; determining that the sixth port number is obtained; and translating the first network address into the second network address according to the first mapping relationship, to obtain a second target downlink data packet.

The network interface 505 further specifically has the following function: sending the second target downlink data packet to the virtual terminal.

The processor 501 further has the following function: determining that the fifth port number is obtained. The network interface 505 further specifically has the following function: sending the second downlink data packet to the physical terminal.

In this embodiment, the processor 501 may obtain the first network address and the first port number of the physical terminal in different manners, and then the processor 501 changes the second network address and the second port number that are of the virtual terminal according to the first network address and the first port number that are obtained by the processor 501, that is, changes the second network address to the first network address while ensuring that the port number of the physical terminal is not in conflict with the port number of the virtual terminal. The virtual terminal performs data transmission with the mobile network according to the first network address and a port that is not in conflict with the port number of the physical terminal. In this way, when the host machine cannot directly connect to the network, the virtual terminal can still connect to the mobile network. This extends an application scope of the virtual terminal.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software function unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present disclosure.

What is claimed is:

1. A data transmission method, comprising:
   obtaining, by a host machine, a first network address of a physical terminal, wherein the physical terminal has started to establish a connection or has established a connection to a mobile network;
   setting, by the host machine, a second network address of a virtual terminal to the first network address; and
   sending, by the virtual terminal, data to the mobile network by using the first network address and/or receiving, by the virtual terminal, data sent by the mobile network by using the first network address, wherein the virtual terminal runs on the host machine; and, wherein
   obtaining, by the host machine, the first network address of the physical terminal comprises:
     receiving, by the host machine, a data packet sent by the physical terminal, wherein the physical terminal has established a connection to the mobile network; and
     parsing, by the host machine, the data packet to obtain the first network address of the physical terminal; and, wherein
   after obtaining, by a host machine, a first network address of a physical terminal, the method further comprises:
     when the host machine determines that a first port number of the physical terminal is in conflict with a second port number of the virtual terminal, configuring, by the host machine, the first port number to a third port number, and configuring the second port number to a fourth port number, wherein the first port number is obtained by the host machine by parsing the data packet sent by the physical terminal, and the third port number is not in conflict with the fourth port number; and
   sending, by the virtual terminal, data to the mobile network by using the first network address and/or receiving, by the virtual terminal, data sent by the mobile network by using the first network address comprises:
     sending, by the virtual terminal, the data to the mobile network by using the first network address and the fourth port number and/or receiving, by the virtual terminal, the data sent by the mobile network by using the first network address and the fourth port number.

2. The data transmission method according to claim 1, wherein obtaining, by the host machine, the first network address of the physical terminal comprises:
   obtaining, by the host machine, the first network address of the physical terminal from a network address storage module.

3. The data transmission method according to claim 1, wherein after sending, by the virtual terminal, the data to the mobile network by using the first network address and the fourth port number, the method further comprises:
   recording, by the host machine, a first mapping relationship and a second mapping relationship, wherein the first mapping relationship is for indicating that the second network address is set to the first network address, and the second mapping relationship is for indicating that the first port number is configured to the third port number and the second port number is configured to the fourth port number;

receiving, by the host machine, a first downlink data packet sent by the mobile network;

parsing, by the host machine, the first downlink data packet to obtain the third port number and/or the fourth port number, and the first network address;

when the host machine determines, according to the second mapping relationship, that the fourth port number is the second port number, translating, by the host machine, the first network address into the second network address according to the first mapping relationship, to obtain a first target downlink data packet;

sending, by the host machine, the first target downlink data packet to the virtual terminal; and when the host machine determines, according to the second mapping relationship, that the third port number is the first port number, sending, by the host machine, the first downlink data packet to the physical terminal.

4. The data transmission method according to claim 1, wherein:

before obtaining, by the host machine, the first network address of the physical terminal, the method further comprises:

determining, by the host machine, a fifth port number of the physical terminal from a first preset value range, and determining a sixth port number of the virtual terminal from a second preset value range, wherein the first value range and the second value range are not overlapped; and sending, by the virtual terminal, data to the mobile network by using the first network address and/or receiving, by the virtual terminal, data sent by the mobile network by using the first network address, comprises:

sending, by the virtual terminal, the data to the mobile network by using the first network address and the sixth port number and/or receiving, by the virtual terminal, the data sent by the mobile network by using the first network address and the sixth port number.

5. The data transmission method according to claim 4, wherein after sending, by the virtual terminal, the data to the mobile network by using the first network address and the sixth port number and/or receiving, by the virtual terminal, the data sent by the mobile network by using the first network address and the sixth port number, the method further comprises:

recording, by the host machine, a first mapping relationship;

receiving, by the host machine, a second downlink data packet sent by the mobile network;

parsing, by the host machine, the second downlink data packet to obtain the fifth port number and/or the sixth port number, and the first network address;

when the host machine determines that the sixth port number is obtained, translating, by the host machine, the first network address into the second network address according to the first mapping relationship, to obtain a second target downlink data packet;

sending, by the host machine, the second target downlink data packet to the virtual terminal; and when the host machine determines that the fifth port number is obtained, sending, by the host machine, the second downlink data packet to the physical terminal.

6. A host machine, comprising:

a receiver, configured to obtain a first network address of a physical terminal, wherein the physical terminal has started to establish a connection or has established a connection to a mobile network; and a processor, configured to set a second network address of a virtual terminal to the first network address received by the receiver, wherein the first network address is set for the virtual terminal for sending data to the mobile network and/or receiving data sent by the mobile network, wherein the virtual terminal runs on the host machine and wherein the receiver is further configured to receive a data packet sent by the physical terminal, wherein the physical terminal has established a connection to the mobile network; and the processor is further configured to parse the data packet to obtain the first network address of the physical terminal; and when it is determined that a first port number of the physical terminal is in conflict with a second port number of the virtual terminal, configure the first port number to a third port number, and configure the second port number to a fourth port number, wherein the first port number is obtained by the host machine by parsing the data packet sent by the physical terminal, and the third port number is not in conflict with the fourth port number, and wherein the fourth port number is set for the virtual terminal for sending data to the mobile network and/or receiving data from the mobile network.

7. The host machine according to claim 6, wherein the receiver is further configured to obtain the first network address of the physical terminal from a network address storage module.

8. The host machine according to claim 6, wherein:

the processor is further configured to:

record a first mapping relationship and a second mapping relationship, wherein the first mapping relationship is for indicating that the second network address is set to the first network address, and the second mapping relationship is for indicating that the first port number is configured to the third port number and the second port number is configured to the fourth port number;

the receiver is configured to receive a first downlink data packet sent by the mobile network;

the processor is further configured to:

parse the first downlink data packet received by the receiver, to obtain the third port number and/or the fourth port number, and the first network address, and when the host machine determines, according to the second mapping relationship, that the fourth port number is the second port number, translate the first network address into the second network address according to the first mapping relationship, to obtain a first target downlink data packet; and the host machine further comprises:

a transmitter, configured to:

send, to the virtual terminal, the first target downlink data packet generated by the processor, and when the host machine determines, according to the second mapping relationship, that the third port number is the first port number, send, to the physical terminal, the first downlink data packet received by the receiver.

9. The host machine according to claim 6, wherein the processor is further configured to:
determine a fifth port number of the physical terminal from a first preset value range, and determine a sixth port number of the virtual terminal from a second preset value range, wherein the first value range and the second value range are not overlapped, and wherein the sixth port number is set for the virtual terminal for sending data to the mobile network and/or receiving data from the mobile network.

10. The host machine according to claim 9, wherein:
the receiver is further configured to receive a second downlink data packet sent by the mobile network;
the processor is further configured to:
record the first mapping relationship,
parse the second downlink data packet received by the receiver, to obtain the fifth port number and/or the sixth port number, and the first network address, and
when the host machine determines that the sixth port number is obtained, translate the first network address into the second network address according to the first mapping relationship, to obtain a second target downlink data packet; and
the transmitter is further configured to:
send, to the virtual terminal, the second target downlink data packet generated by the processor, and
when the host machine determines that the fifth port number is obtained, send, to the physical terminal, the second downlink data packet received by the receiver.

11. A host machine, comprising:
a network interface configured to obtain a first network address of a physical terminal; and
a processor configured to set a second network address of a virtual terminal to the first network address, wherein the first network address is set for the virtual terminal for sending data to the mobile network and/or receiving data sent by the mobile network, and wherein
the network interface is further configured to receive a data packet sent by the physical terminal, wherein the physical terminal has established a connection to the mobile network; and
the processor is further configured to
parse the data packet to obtain the first network address of the physical terminal; and
when it is determined that a first port number of the physical terminal is in conflict with a second port number of the virtual terminal, configure the first port number to a third port number, and configure the second port number to a fourth port number, wherein the first port number is obtained by the host machine by parsing the data packet sent by the physical terminal, and the third port number is not in conflict with the fourth port number, and wherein the fourth port number is set for the virtual terminal for sending data to the mobile network and/or receiving data from the mobile network.

12. The host machine according to claim 11, wherein the network interface is further configured to obtain the first network address of the physical terminal from a network address storage module.

13. The host machine according to claim 11, wherein:
the network interface is configured to receive a first downlink data packet sent by the mobile network;
the processor is further configured to:
record a first mapping relationship and a second mapping relationship, wherein the first mapping relationship is for indicating that the second network address is set to the first network address, and the second mapping relationship is for indicating that the first port number is configured to the third port number and the second port number is configured to the fourth port number,
parse the first downlink data packet receiving by the receiver, to obtain the third port number and/or the fourth port number, and the first network address, and
when the host machine determines, according to the second mapping relationship, that the fourth port number is the second port number, translate the first network address into the second network address according to the first mapping relationship, to obtain a first target downlink data packet; and
the network interface is further configured to:
send, to the virtual terminal, the first target downlink data packet generated by the processor, and
when the host machine determines, according to the second mapping relationship, that the third port number is the first port number, send, to the physical terminal, the first downlink data packet received by the receiver.

14. The host machine according to claim 11, wherein the processor is further configured to:
determine a fifth port number of the physical terminal from a first preset value range, and determine a sixth port number of the virtual terminal from a second preset value range, wherein the first value range and the second value range are not overlapped, and wherein the sixth port number is set for the virtual terminal for sending data to the mobile network and/or receiving data from the mobile network.

* * * * *